United States Patent [19]
Babel

[11] Patent Number: 5,117,552
[45] Date of Patent: Jun. 2, 1992

[54] MACHINING CENTER

[75] Inventor: Werner Babel, Pfronten, Fed. Rep. of Germany

[73] Assignee: MAHO Aktiengesellschaft, Fed. Rep. of Germany

[21] Appl. No.: 684,879

[22] Filed: Apr. 12, 1991

[30] Foreign Application Priority Data

Apr. 20, 1990 [DE] Fed. Rep. of Germany ....... 4012690

[51] Int. Cl.$^5$ .................. B23Q 3/157; B23C 1/00; B23B 39/02
[52] U.S. Cl. .................................. 483/36; 82/149; 409/235; 483/39
[58] Field of Search ............... 29/568, 563; 409/235; 408/234; 82/149, 137

[56] References Cited

U.S. PATENT DOCUMENTS

| | | | |
|---|---|---|---|
| 3,011,373 | 12/1961 | Waldrich | 82/149 |
| 4,444,534 | 4/1984 | Bergman | 409/235 X |
| 4,478,117 | 10/1984 | Brown et al. | 82/149 |
| 4,644,635 | 2/1987 | Murai | 29/568 |
| 4,792,267 | 12/1988 | Warner | 409/235 |

FOREIGN PATENT DOCUMENTS 167730 8/1985 Japan .................... 409/235

Primary Examiner—William Briggs
Attorney, Agent, or Firm—Baker, Maxham, Jester & Meador

[57] ABSTRACT

A machining center having a bed that supports a work table, a carriage movable along the bed, an upright column moveable across the carriage, a machining head movable vertically on the upright column and a tool magazine with a tool changer. The bed is designed as an inclined bed with a downward slope toward the rear and the work table is mounted on the front side of bed by means of a suitable console.

29 Claims, 2 Drawing Sheets

MACHINING CENTER

FIELD OF THE INVENTION

This invention relates generally to machine tools, and more particularly concerns a machining center especially for machining metal workpieces.

BACKGROUND OF THE INVENTION

Machine tools in a bed arrangement have so far been preferred for machining heavy workpieces because the work table rests on the rigid machine bed. The required vertical motion is produced by the headstock which is guided on the upright column that is either rigidly mounted on the bed or is mounted so that it can move in one axis. The work table can be designed as a compound table or as a revolving table or turntable, and it can rest on wide rigid tracks of the bed, which thus yields a high dynamic strength and rigidity. The known machining centers with a bed design are mostly designed according to principles that have also been used by traditional machine tools that are only partially automated. Although a complete degree of automation has been achieved on existing machining centers through appropriate control systems using tool magazines with automatic tool changing and workpiece pallets, these known machining centers are limited owing to their basic technical concept in rapid and universal machining of workpieces which can be attributed to relatively long tool-changing times or workpiece-changing times, or both, to the problem of removal of chips and cuttings which has not been solved optimally, and also to inaccuracies caused by thermal expansion or vibration, among others.

SUMMARY OF THE INVENTION

The purpose of this invention is to create a machining center especially for mass production of small and medium-sized workpieces whereby the requirements originating from fully automatic work sequences, such as short tool changing times, reliable removal of cutting waste, low influence of thermal expansion and vibration on machining accuracy, for example, are met in an effective and logical manner. The purpose is met according to this invention primarily by the fact that the bed is inclined with a downward tilt toward the rear, and the work table is arranged on the front side of the bed.

In comparison with traditional horizontal beds, the inclined bed with a downward slope at an acute angle toward the rear has the advantage that the oil required for lubrication of the guidance track on the top of the bed can run down toward the rear into a channel provided at the back and can be collected separately from the tool cooling liquid which flows down channels in the front of the tool. In addition, there is also the possibility of a stable three-point support of the bed on the foundation, where the two rear supporting feet preferably support the weight due to the carriage, the upright column and the machining head, and the supporting foot provided on the front side of the bed in the axis of movement of the upright column preferably holds the weight of the work table including its console. This arrangement of the work table on the front side of the bed facilitates rapid changing of workpieces mounted on pallets because the work table projects beyond the front side of the bed and is freely accessible for simple transfer of pallets. If the work table is permanently mounted on bed mounts on the front faces, then the movements previously required to achieve the pallet changing position are not necessary, and this shortens changing times.

The arrangement of the work table according to this invention on the facing side of the bed creates the possibility of a greatly improved method of removing chips and shavings through one or more channels for chips arranged between and next to the table mounts in the bed and opening into a lower chip box.

According to another expedient design of this invention, the upright column that can move on the horizontal cross-guides of the carriage has two rigid upright columns, preferably with a rectangular cross section, rigidly connected together by a bottom crosshead and a top crosshead, and the machining head is guided on both sides along the inside vertical guides. An especially great rigidity is obtained when the two upright columns and the top and bottom crossheads are designed as a structural part in one piece. The different machining heads can be mounted in the upright columns from the rear, which permits a relatively simple method of conforming to different machining requests by customers.

According to another expedient embodiment of this invention, a chip apron can be provided on the front side of the upright column, so the chips together with the cooling fluid and the rinsing fluid run into the vertical chip channels of the bed. This chip apron is preferably designed with louvers and is mounted on the bed at the lower end and is mounted on the machining head at the upper end, so the guides of the carriage and also the frame-like upright column are always covered with respect to the work area.

The arrangement of the table in the vertical face of the bed also makes it possible to attach various types of table accessories to the bed while always achieving a uniform dimension rigidity.

Finally, an expedient refinement of this invention is characterized in that the tool magazine with its tool changer is provided in a stationary position next to the upright column of the carriage. When the carriage moves toward the magazine and tool changer a tool changing operation can be efficiently carried out.

BRIEF DESCRIPTION OF THE DRAWING

The objects, advantages and features of the machining center according to this invention will be more readily comprehended from the following written description, when read in conjunction with the accompanying, in which.

DESCRIPTION OF THE PREFERRED EMBODIMENT

Figure 1:
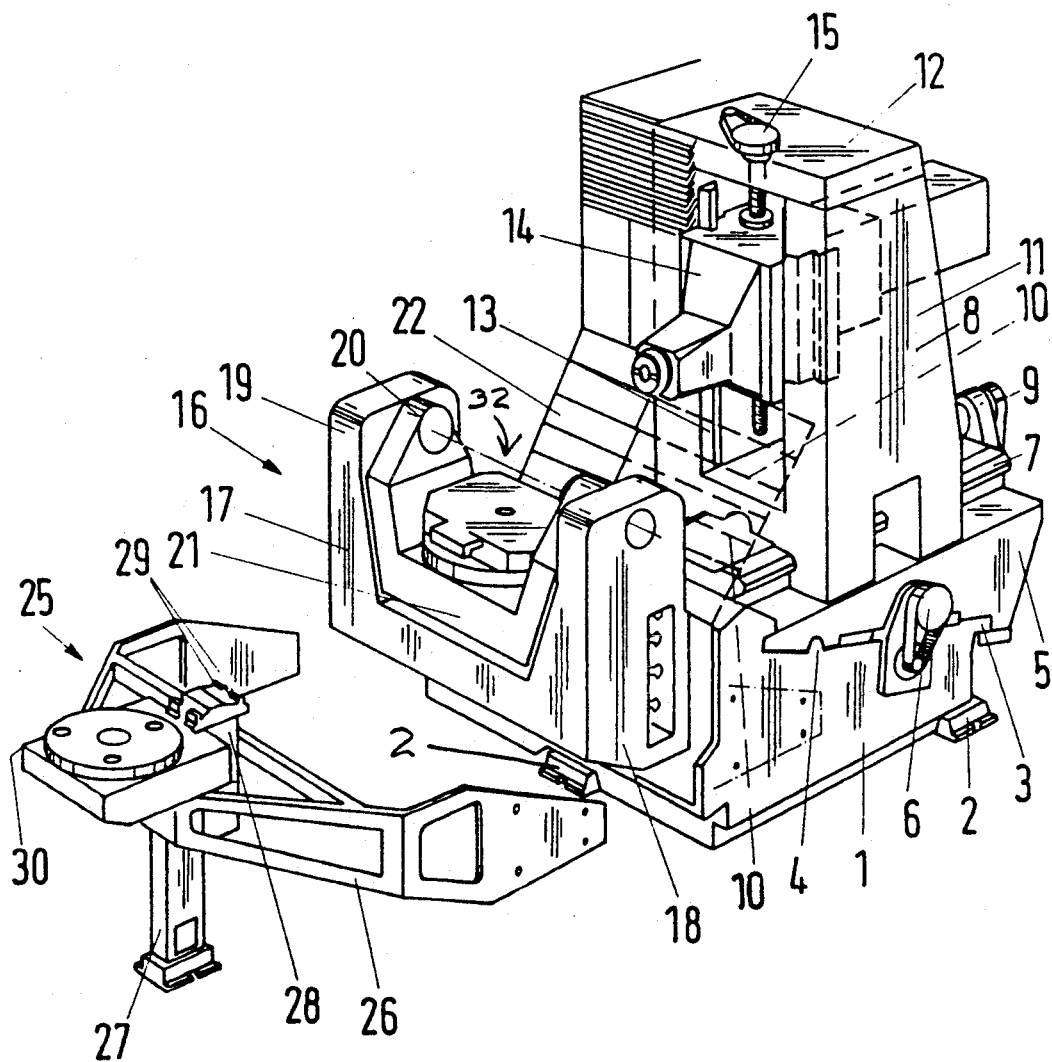
FIG. 1 is a first embodiment of the machining center constructed according to this invention with a pallet changer and a swing-out table in a schematic perspective diagram.

With reference now to the drawing and more particularly to FIG. 1, there is shown the machining center of the invention constructed with inclined bed 1 which rests on the floor or foundation by means of two rear feet and one middle front foot, all designated by the reference numeral 2. The surface of the bed 1 is inclined downward toward the rear at a relatively acute angle of 10° to 30° from the horizontal, and is formed with two guide strips 3 and 4 which run horizontally in the longitudinal direction of the bed and serve to guide carriage 5 which moves by means of drive motor 6. Cross guides 7 are provided on the horizontal surface of carriage 5 which has a triangular or trapezoidal cross section. Upright column 8 is designed as a closed frame which is guided by means of drive 9 on these cross guides. The upright column has bottom crosshead 10 which is made in once piece with two upright columns 11 which have a rectangular cross section. Upper crosshead 12 is provided to increase the rigidity of the column assembly. Vertical guides 13 are mounted on the inside of the two upright columns to provide tracks on which machining head 14 is guided. The machining head can be moved by means of drive 15.

Swing-out table 16 is mounted on the vertical front face of bed 1 and consists of a console formed of C-shaped rigid frame 17 and carrying strap 21, mounted so it pivots about axis 20 in the two legs of frame 18 and 19. Lathe 32 is mounted in the middle of the carrying strap. Apron 22 (shown partially with dotted lines), preferably designed as louvers, is provided on the front side of the upright column and its upper edge is attached to the machining head so that the space between the front side of the upright column and the work table is constantly covered when there is any vertical movement of machining head 14. The apron should extend longitudinally over the entire length of the bed and should permit a longitudinal movement of the carriage together with the upright column. For this purpose, the apron may have a guide rail on its upper end that engages with a sliding block mounted on the machining head.

In the machining center illustrated in FIG. 1, pallet changer 25 is shown positioned in front of swing-out work table 16 and is attached by horizontal strap construction 26 to the side walls (indicated with dash-dot lines) or to the front face of bed 1. Pallet changer 25 can be supported on the foundation by way of support 27. Lifting and lathing column 28 is equipped with diametrically opposed claws 29, in which a pallet that rest on a pallet support 30 is suspended by means of a vertical movement of upright column 28. On the basis of rotating movement of upright column 28, there is a pallet change between the resting position shown here and the working position on the work table.

Figure 2:
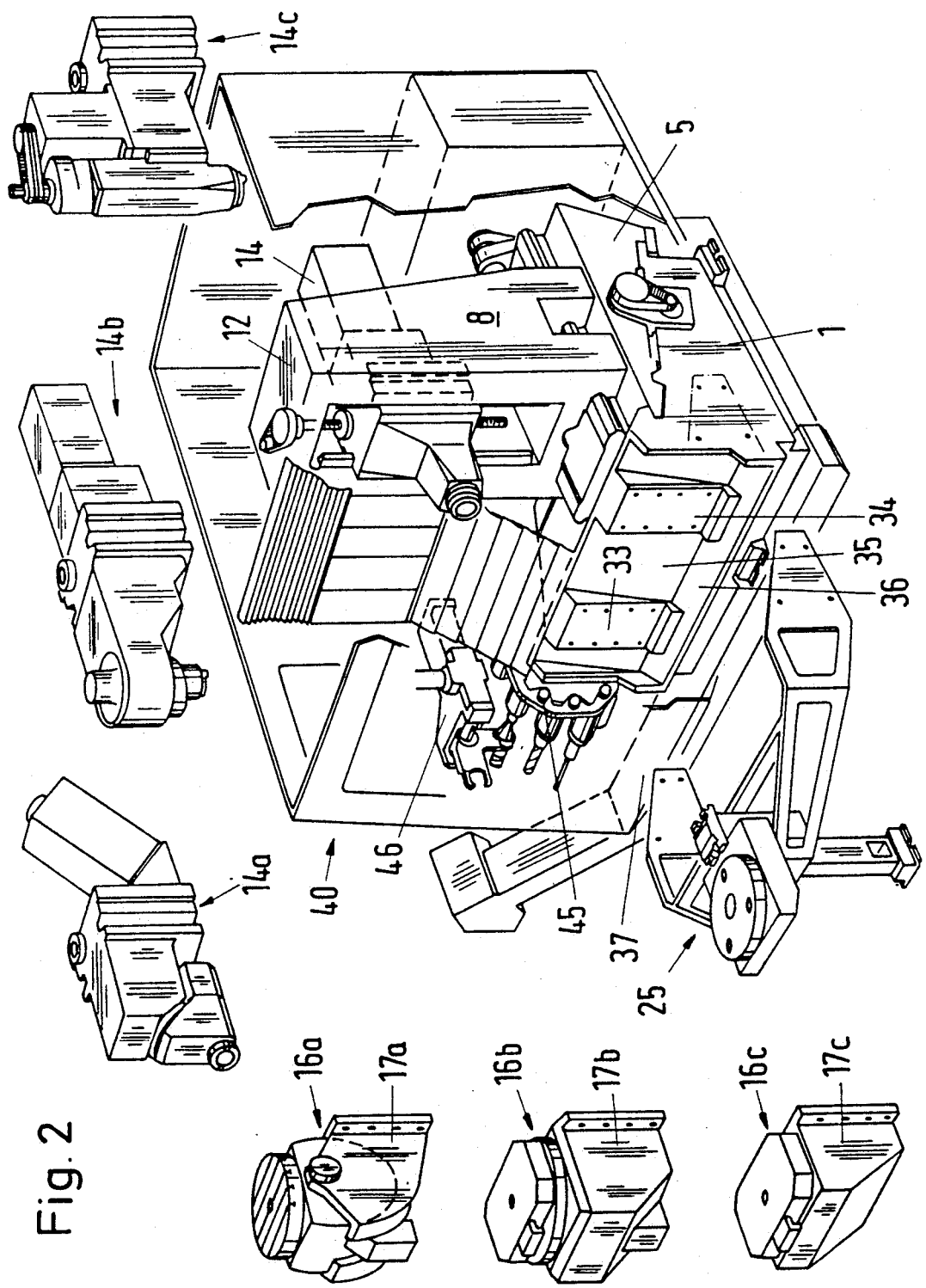
FIG. 2 shows an alternative embodiment of the invention with different machining heads and work tables arranged around the machining center in a schematic perspective form.

The machining center illustrated in FIG. 2 corresponds in its essential components to that illustrated in FIG. 1, so the same parts are also labeled with the same reference numerals. Optionally, one of the work tables 16a, 16b and 16c shown at the left can be mounted on front mounts 33 and 34 that are provided on the front face of bed 1 by means of consoles 17a, 17b and 17b. Vertical chip channel 35 is provided on the front face of the bed between two mounts 33 and 34 and another is provided outside each side of the mounts, all the chip channels opening into chip conveyor 37 by way of chute 36.

Three different machining heads 14a, 14b and 14c which can optionally be installed in upright column 8 are shown in the upper part of FIG. 2. Furthermore, a safety enclosure 40, which is conventional with such machining centers, is also provided. Within the enclosure, and cooperatively arranged with the machining center of the invention are tool magazine 45 and tool changer 46. The tool changer and magazine are operative pursuant to movement of inclined carriage 5 toward them, so that when the appropriate elements are in close proximity, tool changing can be conveniently effected.

The advantages of the invention can now be easily appreciated. Because of the rearward incline of the machine bed, lubricating oil for the guideways of the inclined bed surface can run down toward the rear of the machine tool bed. At the same time, cooling fluid is separate and runs down at the front of the machine bed, carrying with it the waste chips and shavings from machining operations. This configuration facilitates separate collection of the two fluids. In comparison with horizontal bed construction of other machine tools, inclined bed 1 and carriage 5 movable thereon are more rigid and less subject to thermal deformations and vibrations because of their triangular shapes.

In prior art bed type machines the work table is mounted on top of the bed or is integrated therein. Chips produced during the machining operation drop down onto the machine bed, from which they must be removed. An advantage of the work table arrangement of the invention is that various types of work tables, such as swivel tables, round tables, among others, may be attached in a simple manner with a high degree of flexibility. The machine tool can also be attached to external workpiece flow facilities, wherein the various work tables may be replaced by suitable work handling equipment such as large round tables having a plurality of workpiece accommodations.

This invention is not limited to the embodiments described above and illustrated in the figures but instead it also includes other functional units and working units that can be integrated into the technical concept described here by the modular principle. For example, instead of the machining heads with rotary driven tools, special measurement heads or combinations of measurement heads and machining heads can be mounted on the double columns. Furthermore, the machine can also be mounted on external workpiece carrier systems and transfer lines as part of a complex machining system, in which case the table models shown in the figures can be replaced by suitable positioning units for the workpieces, for example, large-scale turntables with a number of workpiece seats or vertical conveyor columns. Accordingly, this invention is limited only by the spirit and scope of the accompanying claims.

What is claimed is:

1. A machining center comprising:
   a bed adapted to be supported on a foundation;
   a substantially continuous inclined surface sloping downwardly to the rear on said bed, said inclined surface providing means for conducting a lubricant material toward the rear on said bed;
   a carriage mounted on said inclined surface for longitudinal movement thereon;
   an upright column mounted on said carriage for lateral movement thereon;
   a machining head mounted to said column for vertical movement thereon; and
   a work table mounted to the front of said bed for cooperative operation on a workpiece on said wok table by said machining head.

2. A machining center comprising:
   a bed adapted to be supported on a foundation;
   an inclined surface sloping downwardly to the rear on said bed;
   a carriage mounted on said inclined surface for longitudinal movement thereon;

an upright column mounted on said carriage for lateral movement thereon;

a machining head mounted to said column for vertical movement thereon;

a work table mounted to the front of said bed for cooperative operation on a workpiece on said work table by said machining head;

a pair of spaced mounted arranged on said bed, said mounts being adapted to receive a console to which said work table is mounted; and at least one chip chute on the front of said bed to guide machine removed chips away from work areas.

3. The machining center recited in claim 1, wherein:

said upright column is formed of two rigid columns rigidly connected together by means of at least one crosshead;

a vertical guide on each said upright column on which said machining head moves vertically.

4. The machining center recited in claim 2, wherein:

said upright column is formed of two rigid columns rigidly connected together by means of at least one crosshead;

a vertical guide on each said upright column on which said machining head moves vertically.

5. The machining center recited in claim 1, wherein said machining head is interchangeably mounted on said upright column.

6. The machining center recited in claim 2, wherein said machining head is interchangeably mounted on said upright column.

7. The machining center recited in claim 3, wherein said machining head is interchangeably mounted on said upright column.

8. The machining center recited in claim 4, wherein said machining head is interchangeably mounted on said upright column.

9. A machining center comprising:

a bed adapted to be supported on a foundation;

an inclined surface sloping downwardly to the rear on said bed;

a carriage mounted on said inclined surface for longitudinal movement thereon;

an upright column mounted on said carriage for lateral movement thereon;

a machining head mounted to sad column for vertical movement thereon;

a work table mounted to the front of said bed for cooperative operation on a workpiece on said work table by said machine head; and a chip apron coupled between said bed and said upright column for movement therewith so that chips removed from workpieces are guided to a collection area.

10. The machining center recited in claim 2, and further comprising a chip apron coupled between said bed and said upright column for movement therewith so that chips removed from workpieces are guided into said chip chute.

11. A machining center comprising:

a bed adapted to be supported on a foundation;

an inclined surface sloping downwardly to the rear on said bed;

a carriage mounted on said inclined surface for longitudinal movement thereon;

an upright column mounted on said carriage for lateral movement thereon;

a machining head mounted to said column for vertical movement thereon; and a work table mounted to the front of said bed for cooperative operation on a workpiece on said work table by said machine head;

said upright column being formed of two rigid columns rigidly connected together by means of at least one crosshead;

a vertical guide on each said upright column on which said machining head moves vertically; and a chip apron coupled between said bed and said upright column for movement therewith so that chips removed from workpieces are guided to a collection area.

12. The machining center recited in claim 4, and further comprising a chip apron coupled between said bed and said upright column for movement therewith so that chips removed from workpieces are guided into said chip chute.

13. The machining center recited in claim 9, wherein said chip apron is formed with louvers, the lower end of which is mounted to said bed, the upper end of which is coupled to said machining head for movement therewith.

14. The machining center recited in claim 10, wherein said chip apron is formed with louvers, the lower end of which is mounted to said bed, the upper end of which is coupled to said machining head for movement therewith.

15. The machining center recited in claim 11, wherein said chip apron is formed with louvers, the lower end of which is mounted to said bed, the upper end of which is coupled to said machining head for movement therewith.

16. The machining center recited in claim 12, wherein said chip apron is formed with louvers, the lower end of which is mounted to said bed, the upper end of which is coupled to said machining head for movement therewith.

17. The machining center recited in claim 1, wherein said work table is interchangeably mounted to said bed.

18. The machining center recited in claim 2, wherein said console and work table are interchangeably mounted to said bed.

19. The machining center recited in claim 3, wherein said work table is interchangeably mounted to said bed.

20. The machining center recited in claim 4, wherein said console and work table are interchangeably mounted to said bed.

21. The machining center recited in claim 5, wherein said work table is interchangeably mounted to said bed.

22. The machining center recited in claim 9, wherein said work table is interchangeably mounted to said bed.

23. The machining center recited in claim 10, wherein said console and work table are interchangeably mounted to said bed.

24. The machining center recited in claim 1, and further comprising:

a tool magazine arranged adjacent said bed; and a tool changer arranged adjacent said tool magazine in operative relationship with said machining head;

said tool changer being operable by movement of said carriage on said inclined surface toward said tool magazine.

25. The machining center recited in claim 2, and further comprising:

a tool magazine arranged adjacent said bed; and a tool changer arranged adjacent said tool magazine in operative relationship with said machining head;

said tool changer being operable by movement of said carriage on said inclined surface toward said tool magazine.

26. The machining center recited in claim 3, and further comprising:

a tool magazine arranged adjacent said bed; and a tool changer arranged adjacent said tool magazine in operative relationship with said machining head;

said tool changer being operable by movement of said carriage on said inclined surface toward said tool magazine.

27. The machining center recited in claim 4, and further comprising:

a tool magazine arranged adjacent said bed; and a tool changer arranged adjacent said tool magazine in operative relationship with said machining head;

said tool changer being operable by movement of said carriage on said inclined surface toward said tool magazine.

28. The machining center recited in claim 9, and further comprising:

a tool magazine arranged adjacent said bed; and a tool changer arranged adjacent said tool magazine in operative relationship with said machining head;

said tool changer being operable by movement of said carriage on said inclined surface toward said tool magazine.

29. The machining center recited in claim 10, and further comprising:

a tool magazine arranged adjacent said bed; and a tool changer arranged adjacent said tool magazine in operative relationship with said machining head;

said tool changer being operable by movement of said carriage on said inclined surface toward said tool magazine.

* * * * *